United States Patent
Moore

[15] 3,670,743
[45] June 20, 1972

[54] VEHICLE WHEEL WASHING APPARATUS

[72] Inventor: Werton Dewitt Moore, Dallas, Tex.
[73] Assignee: Delta Manufacturing and Engineering Corporation, Dallas, Tex.
[22] Filed: Oct. 12, 1970
[21] Appl. No.: 62,058

[52] U.S. Cl. .................................................. 134/45, 239/551
[51] Int. Cl. .................................................. B60s 3/04
[58] Field of Search ................................. 134/45, 47, 49, 123; 15/DIG. 2; 239/551

[56] References Cited

UNITED STATES PATENTS 3,593,726  7/1971  Lockhart .................................. 134/45
3,596,241  7/1971  Migneault .............................. 134/45 X

FOREIGN PATENTS OR APPLICATIONS 1,275,393  8/1968  Germany ................................. 134/45

Primary Examiner—Robert L. Bleutge
Attorney—Walter J. Jagmin

[57] ABSTRACT

An apparatus for directing sprays of liquid on outer side surfaces of each pair of wheels of a vehicle as the wheels roll past pairs of spray nozzles, the liquid being expelled under pressure through spray nozzles by flexible pump conduits which are progressively longitudinally occluded by a vehicle wheel as it rolls over the pump conduits.

7 Claims, 4 Drawing Figures

INVENTOR.
Werton Dewitt Moore
BY
Walter J Jagm
ATTORNEY

INVENTOR.
Werton Dewitt Moore
BY
Walter J. Jagm
ATTORNEY

VEHICLE WHEEL WASHING APPARATUS

This invention relates to washing apparatus and more particularly to an apparatus for washing the outer side surfaces of wheels of vehicles.

An object of this invention is to provide a new and improved apparatus for washing the outer side surfaces of wheels of vehicles as the vehicle is driven past the apparatus.

Another object is to provide an apparatus of the type described which utilizes the weight of the vehicles themselves for providing the force for expelling the liquid under pressure through the nozzles.

Still another object is to provide a vehicle wheel washing apparatus which is of simple and economical construction.

An important object of the invention is to provide an apparatus for washing wheels of vehicles which includes flexible non-resilient pump conduits or hoses which are progressively longitudinally occluded by a wheel of the vehicle as the wheel rolls therepast to cause the liquid in the flexible conduit means forwardly of the direction of movement of the wheel to be expelled through a spray nozzle as the wheel rolls thereover.

A further object is to provide a vehicle wheel washing apparatus having a valve interposed between the spray nozzle and the pump conduit which opens to permit flow of liquid to the spray nozzle when the pressure of the liquid in the pump conduit forwardly of a wheel rolling thereover exceeds a predetermined value.

Additional objects and advantages of the invention will be readily apparent from the reading of the following description of a device constructed in accordance with the invention, and reference to the accompanying drawings thereof, wherein.

Figure 3:
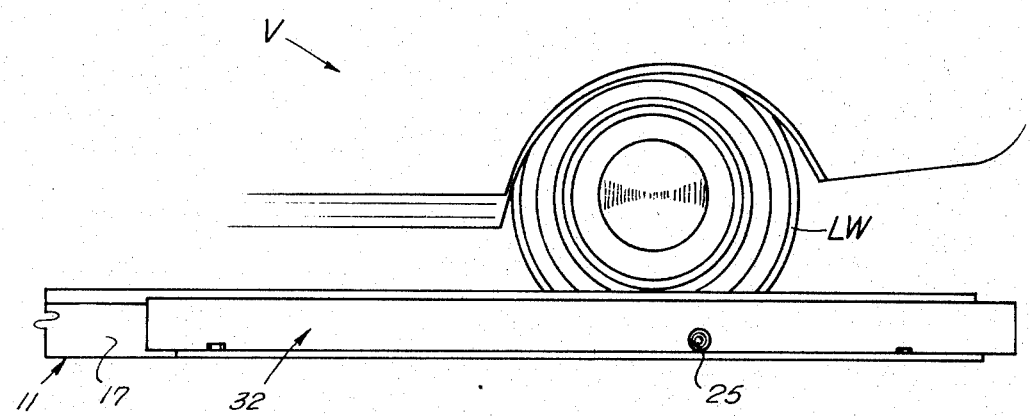

FIG. 3 showing the manner in which the sprays of wash liquid are directed on the outer side surfaces of each pair of wheels of a vehicle; and, FIG. 4 is a side view of the wheel washing apparatus showing the manner in which the spray of wash liquid are directed on the outer side surfaces of the right wheels of the vehicle.

Referring now to the drawings, the wheel washing apparatus 10 embodying the invention includes a guide track 11 having a bottom horizontal web 12 which is secured to a base, such such as a concrete floor or the like in any suitable manner, as by means of studs 14 whose lower ends are embedded in the base and which project upwardly through suitable apertures in the web 12 and nuts 15 threaded on the upper ends of the studs. The guide track 11 includes a pair of vertical parallel spaced walls 16 and 17 between which the right wheels of an automobile or other vehicle may roll. The side walls are provided with outwardly and downwardly curved flanges 18 and 19, respectively.

A pair of flexible but non-resilient pump conduits or hoses 21 and 22 extend longitudinally within the track 11 between the side walls 16 and 17 thereof and web of the track. A wash liquid, such as a solution of detergent and water, is supplied to the front or right end of the front pump conduit 21 from a suitable source of the wash liquid, such as a tank, through a main conduit 25, a T-coupling 26, a conduit 27, a nipple 28, and an elbow 29. The right end of the pump conduit 21 is of course secured to the elbow 29 in any suitable manner as by bonding, clamping or the like. The conduit 25 extends through a suitable aperture in the longitudinal side wall 31 of a housing 32 disposed outwardly of the outer side wall 17 of the track 11 and secured to the concrete base or floor by means of studs 33, whose lower ends are embedded in the concrete, which extend upwardly through suitable apertures in the horizontal bottom flanges 34 and 35 integral with the side wall 31 and 36, respectively, of the housing 32.

The conduit 27 extends over and is secured to a horizontal support plate 37 which may be welded or otherwise secured to the outer side wall 31 of the housing. The nipple 28 extends through a suitable aperture in the side wall 17 of the track and is rigidly secured to the side wall by a lock ring 39.

The rear or discharge end of the pump conduit 21 is connected by a suitable connector 41 to the inlet of a T-fitting or coupling 42. A conduit 44 connected to one outlet of the T-coupling 42 extends laterally outwardly through a suitable aperture in the side wall 17 of the track guide 11 and the inner side wall 36 of the housing. The conduit 44 has a longitudinally extending portion 44a which rests on the support plate 37 and is secured thereto by means of suitable clamps 45 secured to the tieplate by any suitable means, such as screws 46. The front end of a conduit is connected to a coupling 48 which in turn has a pressure regulating valve 50 secured thereto by suitable nipple 51.

The valve 50 opens to permit flow of fluid therethrough when the pressure of the fluid in the pump conduit 21, transmitted to the valve inlet exceeds a predetermined value, as for example nine or ten pounds per square inch. The valve 50 may be of any suitable type such as model FIG. No. 217 Ball Check Valve commercially available from F. C. Kingston Company of Los Angeles, California.

A nozzle 54 is secured to the outlet end of the valve 50 for directing a cone shaped spray of liquid upwardly and inwardly at the outer side surfaces of the left wheels LW of the vehicle V through a window or aperture 56 of the housing 32.

The other outlet of the T-coupling 42 is connected to a similar nozzle 57, which directs a spray of liquid at the outer side surfaces of the right wheels of the vehicle, by means of a conduit 58, which extends through a channel shaped protector housing 59 and a suitable aperture in the side wall 61 of an elongate housing 62, a coupling 63 and a pressure actuated valve 64. The longitudinally extending portion 58a of the conduit 58 rests on a support plate 66 and is secured thereto by a suitable clamp 67 secured to the support plate by screws 68.

The housing 62 is provided with an aperture or window 69 through which the spray from the nozzle 57 passes to the outer side surfaces of the right wheels RW of the vehicle. The protector housing 59 is secured at its outer end portion to the bottom inner flange 71 of the housing 62 and at its inner end to a connector bar 72 which is adapted to rest on the concrete base or floor and be secured thereto by means of studs 73 embedded in the base or floor and nuts 74 threaded on the upper end portions of the studs.

The housing 62 is similar to the housing 32 being of inverted channel shape having a top horizontal wall 75 longitudinal side walls 61 and 77 provided at their lower ends with the flanges 71 and 78, respectively. The flanges 71 and 78 are secured to the concrete wall or floor by means of studs 79, whose lower ends are embedded in the floor and which project upwardly through suitable apertures of the flanges, and nuts 80 threaded thereon.

The conduit 58 may also be secured to the floor or base by a suitable clamp 81.

The front end of the other pump conduit 22 is connected to the other outlet of the T-coupling 26 by means of a conduit 82 which extends through a suitable aperture in the side wall 36 of the housing 32, a nipple 83, which extends through a suitable aperture in the side wall 17 of the track guide 11 and to which it is rigidly secured by a suitable lock nut 84, and an elbow coupling 85 to which the front end of the pump conduit 22 is connected in any suitable manner, as by adhesive, bonding agent, clamp fit or the like.

The front or outlet end of the pump conduit 22 is connected to left and right nozzles 54a and 57a by means similar to those by means of which the nozzles 54 and 57 are connected to the outlet or rear end of the pump conduit 21 and, accordingly, the various elements of such conduit means are provided with the same reference numerals, to which the subscript "a" has been added, as the corresponding elements of the means by which the outlet end of the pump conduit is connected to the nozzles 54 and 57.

In use, the main supply conduit 25 at its upper end is connected to a tank of the wash liquid so that the wash liquid flows by gravity through the main supply conduit 25 to the two pump conduits and fills the pump conduits and the other conduits to the inlet ends of the pressure actuated normally closed valves 50, 64, 50a and 64a.

Figure 1:
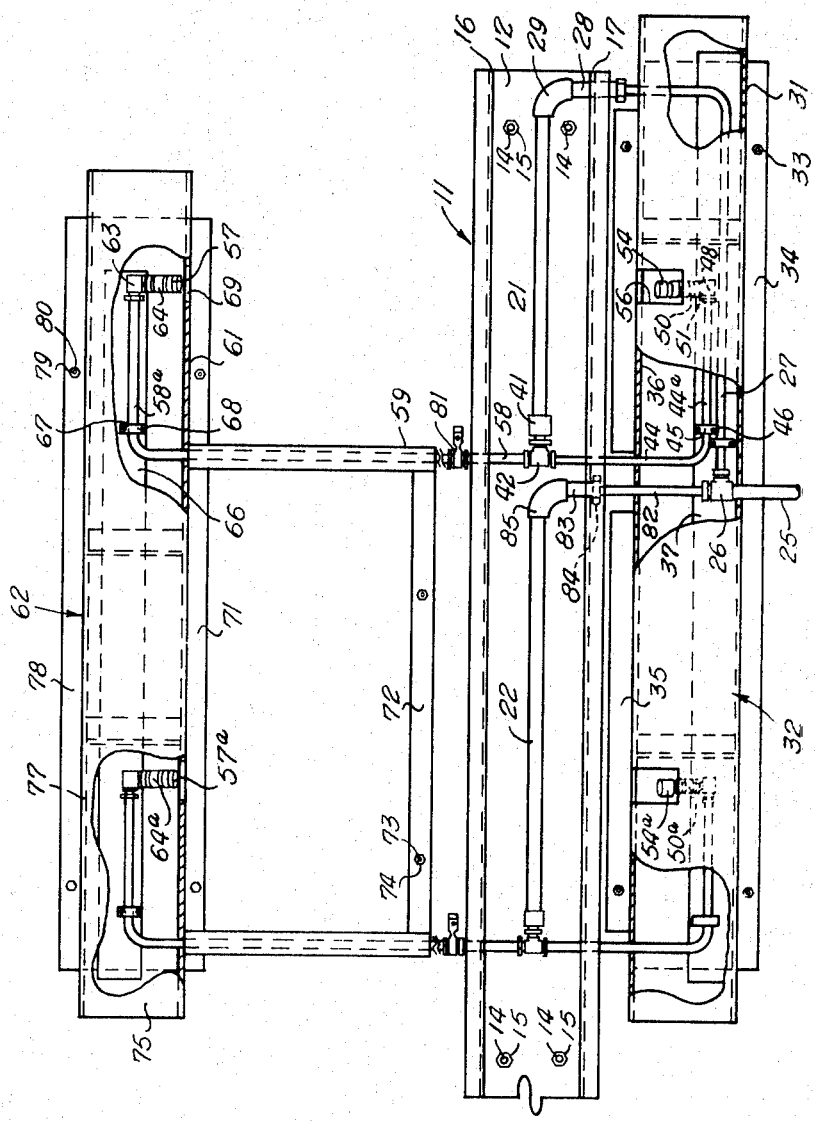
FIG. 1 is a top view, with some parts broken away, of a vehicle wheel washing apparatus embodying the invention.
Figure 2:
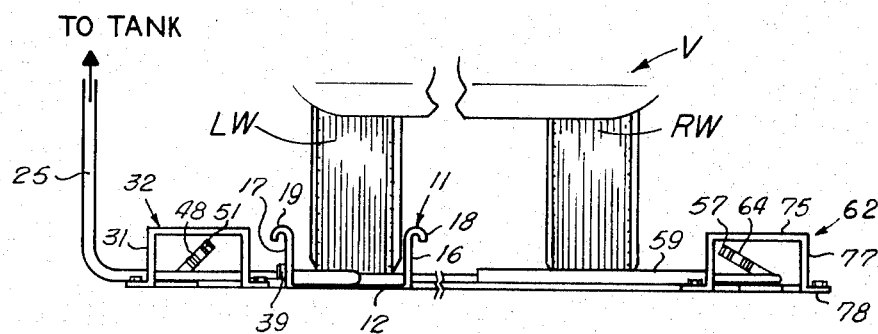
FIG. 2 is an end view of the apparatus taken on line 2—2 of FIG. 1.

A vehicle whose wheels are to be subjected to the sprays of the wash equipment is driven to the right hand side (FIG. 1) of the apparatus so that its front left wheel enters the front end of the track guide 11 and passes between the side walls 16 and 17 of the track guide. This causes the right wheels of the vehicle to pass inwardly of and adjacent the inner side wall of the housing 62. As the left front wheel of the vehicle moves in the track guide, its tire passes over the elbow 29 and nipple 28, which are of steel or other suitable rigid strong substance, and engages the front end of the flexible pump conduit 21. The force imposed by the left wheel LW occludes the front end of the pump conduit and the location of the occlusion progresses longitudinally rearwardly along the pump conduit 21 as the left front wheel rolls thereover. Since the wash liquid is incompressible, the liquid in the pump conduit forwardly of the direction of movement of the wheel is displaced and increases the liquid pressure at the valves 50 and 64 causing them to open as the pressure exceeds the value at which they are actuated. As the valves 50 and 64 open, the liquid flows therethrough to the nozzles 54 and 57 and conical sprays of the wash liquid are directed simultaneously at the outer surfaces of the front left and right wheels as the movement of the vehicle through the apparatus continues. The circular areas of the wheels on which sprays impinge are so chosen that all surfaces of the outer surfaces of the wheels are subjected to the sprays during the movement of the left front wheel from the front end to the rear end of the pump conduit 21.

The pump conduit 21 is filled with liquid, rearwardly of the occlusion, from the supply conduit so that the pump conduit is again distended and filled with the wash liquid as the wheel moves off the front end of the pump conduit. The valves 50 and 64 of course close as the wheel moves off the rear end of the pump conduit 21.

Further movement from right to left of the left front wheel of the vehicle causes the left wheel to roll off the elbow 85 onto the front end of the other pump conduit 22 and occlude its front end. As the location of the occlusion of the pump conduit 22 progresses longitudinally from right to left as the left front wheel rolls thereover, the outer surfaces of the front wheels of the vehicle are subjected to sprays of liquid from the nozzles 54a and 57a.

The areas of impingement of the sprays on the outer surfaces of the right and left front wheels, respectively, are so large and so located that all outer surfaces of the front pair of wheels are subjected to the two sprays of wash liquid during their movement through the apparatus.

The pressure actuated valves associated with the nozzles are set to open at such pressure that the sprays have a certain minimum velocity at the location of their impingement with the outer side surfaces of the wheels regardless of the rate of speed of movement of the left wheel over the pump conduits. It will be apparent, of course, that the velocity will increase somewhat over this minimum value as the speed with which the vehicle is being driven through the apparatus increases.

After the front wheels have passed through the apparatus, the rear wheels similarly move past the two pairs of nozzles and as the left rear wheel successively occludes the front and rear pump conduits 21 and 22, the right and left rear wheels of the vehicle are similarly subjected to sprays of the wash liquid from the two pairs of nozzles.

The wheel washing apparatus may be used in conjunction with a vehicle washing apparatus which sprays the outer surfaces of the vehicle so that the wheels in passing through the vehicle washing apparatus may have the wash liquid rinsed off the wheels.

It will now be seen that a new and improved vehicle wheel washing apparatus has been illustrated and described which does not require any motor power for pressurizing the wash liquid to be sprayed on the outer side surfaces of the pairs of wheels of the vehicle, that the motive power for creating the sprays is provided by the vehicle itself, and that the apparatus functions automatically as the vehicle is driven through the apparatus.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A vehicle wheel washing apparatus including: longitudinally extending guide means for guiding movement of a vehicle wheel; a flexible pump conduit extending longitudinally of said guide means whereby a vehicle wheel moving along a longitudinal path of movement predetermined by said guide means occludes said pump conduit, the location of occlusion progressing longitudinally along the length of said pump conduit as the vehicle wheel moves along said path; means connected to a front end of said pump conduit for supplying liquid thereto; a nozzle located at one side of said path of travel for directing a spray of liquid on one side surface of the wheel during its movement in said path; and means connecting the rear end of said pump conduit to said nozzle whereby the liquid displaced by the vehicle from said pump conduit during the movement of said wheel over said pump conduit is expelled through said spray means nozzle.

2. The wheel washing apparatus of claim 1, wherein said conduit means includes a normally closed pressure actuated valve connected between said nozzle and said rear end of said pump conduit, said valve opening to permit flow of liquid to said nozzle through said conduit means when the pressure in said pump conduit forwardly of the wheel exceeds a predetermined value.

3. The wheel washing apparatus of claim 2, wherein said nozzle produces a cone-shaped spray of liquid.

4. A wheel washing apparatus for subjecting outer side surfaces of a pair of vehicle wheels rotatable about a common horizontal axis to sprays of liquids, said apparatus including: a pair of transversely spaced nozzles; guide means for guiding the pair of vehicle wheels for movement in a longitudinal path of movement between said pair of nozzles; pump means disposed in the path of travel of one of the wheels and actuated by said one of said wheels during its movement over said pump means; conduit means for connecting said pump means to said nozzles whereby liquid pumped by said pump means is delivered to said nozzles to cause said nozzles to spray said wheels with the liquid during the movement of said pair of wheels in said path.

5. The apparatus of claim 4, wherein said pump means comprises a longitudinally extending flexible conduit, one of said wheels occluding said flexible conduit to displace the liquid therefrom as the location of occlusion of said pump conduit moves longitudinally along said conduit during the movement of the said one of said wheels thereover.

6. The wheel washing apparatus of claim 5, wherein said conduit means includes a normally closed pressure actuated valve connected between said nozzle and said rear end of said pump conduit, said valve opening to permit flow of liquid to said nozzle through said conduit means when the pressure in said pump conduit forwardly of the wheel exceeds a predetermined value.

7. The wheel washing apparatus of claim 6, wherein said nozzles produce cone-shaped sprays of liquid.

* * * * *